United States Patent
Mayrides et al.

(10) Patent No.: US 10,351,233 B2
(45) Date of Patent: Jul. 16, 2019

(54) VIBRATION CONTROL OF A SWASHPLATELESS COAXIAL ROTOR

(71) Applicant: Sikorsky Aircraft Corporation, Stratford, CT (US)

(72) Inventors: Bryan D. Mayrides, Derby, CT (US); William A. Welsh, North Haven, CT (US); Steven D. Weiner, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 925 days.

(21) Appl. No.: 13/867,402

(22) Filed: Apr. 22, 2013

(65) Prior Publication Data

US 2014/0314563 A1 Oct. 23, 2014

(51) Int. Cl.
*B64C 27/10* (2006.01)
*B64C 27/72* (2006.01)
*B64C 27/00* (2006.01)

(52) U.S. Cl.
CPC ............ *B64C 27/72* (2013.01); *B64C 27/001* (2013.01); *B64C 27/10* (2013.01); *B64C 2027/004* (2013.01); *B64C 2027/7216* (2013.01); *B64C 2027/7244* (2013.01); *Y02T 50/34* (2013.01)

(58) Field of Classification Search
CPC ............................. B64C 27/72; B64C 27/001
See application file for complete search history.

(56) References Cited

U.S. PATENT DOCUMENTS

| 4,946,354 A | 8/1990 | Aubry et al. |
| 5,219,143 A * | 6/1993 | Staple ............... B64C 27/001 244/17.11 |
| 5,655,878 A * | 8/1997 | Yamakawa ............ B64C 27/72 416/114 |

(Continued)

FOREIGN PATENT DOCUMENTS

| EP | 2803570 A1 | 11/2014 |
| EP | 3150489 A1 | 4/2017 |

(Continued)

OTHER PUBLICATIONS

Lacaze, WO 2012/076705 A2, english translation of spefication.*

(Continued)

*Primary Examiner* — Woody A Lee, Jr.
*Assistant Examiner* — Jason A Fountain
(74) *Attorney, Agent, or Firm* — Cantor Colburn LLP

(57) ABSTRACT

A rotary wing aircraft is provided including a dual counter-rotating, coaxial rotor system having an upper rotor system and a lower rotor system rotatable about a common axis. A plurality of blade assemblies is mounted to a portion of either the upper rotor system or the lower rotor system. A plurality of individually controllable actuators is coupled to each of the plurality of blade assemblies. Each of the plurality of actuators is configured to control movement of the coupled blade assembly about a pitch axis. The rotary-wing aircraft additionally includes a sensor system within an airframe. A higher harmonic control (HHC) controller is arranged in communication with the sensor system and the plurality of actuators to individually control the upper rotor system and the lower rotor system to reduce vibration.

12 Claims, 8 Drawing Sheets

(56) References Cited

U.S. PATENT DOCUMENTS

| | | | |
|---|---|---|---|
| 7,648,338 B1* | 1/2010 | Welsh | B64C 27/001 |
| | | | 416/1 |
| 7,900,869 B2* | 3/2011 | Keβler | B64C 27/001 |
| | | | 244/17.13 |
| 8,197,205 B2* | 6/2012 | Rudley | B64C 27/72 |
| | | | 416/1 |
| 8,235,324 B1* | 8/2012 | Birch | B64C 27/68 |
| | | | 244/17.25 |
| 8,499,907 B2 | 8/2013 | Smith et al. | |
| 2003/0060903 A1 | 3/2003 | MacMartin et al. | |
| 2009/0269199 A1 | 10/2009 | Rudley et al. | |
| 2010/0150719 A1 | 6/2010 | Waide et al. | |
| 2012/0181379 A1 | 7/2012 | Eller et al. | |
| 2012/0292434 A1 | 11/2012 | Welsh | |
| 2016/0236773 A1 | 8/2016 | Jolly et al. | |
| 2017/0267338 A1 | 9/2017 | Garcia et al. | |
| 2019/0023382 A1 | 1/2019 | Welsh et al. | |

FOREIGN PATENT DOCUMENTS

| | | |
|---|---|---|
| WO | 2008033884 A2 | 3/2008 |
| WO | 2012076705 A2 | 6/2012 |
| WO | 2014022910 A1 | 2/2014 |

OTHER PUBLICATIONS

European Search Report for EP 14 16 5206; dated Oct. 16, 2014; 8 Pages.

EP Communication pursuant to Article 94(3) EPC; Application No. 14 165 206.5-1754; dated May 17, 2016; pp. 1-5.

EP Communication; Extended European Search Report; Application No. 14165206.5-1754; dated Oct. 16, 2014, pp. 1-8.

J. O'Leary, et al., "Design of Higher Harmonic Control for the ABC," Presented at the American Helicopter Soceity Mideast Region National Specialists' Meeting on Rotor System Design, hiladelphia, Oct. 22-24, 1980, Published Jan. 1982, pp. 1-6.

Thomas R. Norman, et al., "Full-Scale Wind Tunnel Test of a UH-60 Individual Blade Control System for Performance Improvement and Vibration, Loads, and Noise Control," Presented at Forum 65, Sikorsky AHS Online Store: the Vertical Flight Library, May 27, 2009, pp. 1-20.

U.T.P. Arnold, "Certification, Ground and Flight Testing of an Experimental IBC System for the CH-53G Helicopter," AHS Online Store: The Vertical Flight Library, Jun. 11, 2002, pp. 1-12.

Uwe T.P. Arnold, "Development of an Integrated Electrical Swashplateless Primary and Individual Blade Control System," Cheeseman Award Paper, Sep. 2006, pp. 1-14.

D. Patt, et al., "The HHC Algorithm for Helicopter Vibration Reduction Revisited", 45th AIAA/ASME/ASCE/AHS/ASC Structures, Structural Dynamics & Materials Conference, Apr. 19-22, 2004 (29 pp.).

European Patent Office, Extended European Search Report for Application No. 18184087.7-1010, dated Nov. 13, 2018 (10 pp.).

Friedmann, Peretz P., et al., "Vibration Reduction in Rotorcraft Using Active Control: A Comparison of Various Approaches", Journal of Guidance, Control, and Dynamics, vol. 18, No. 4, Jul.-Aug. 1995 (10 pp.).

* cited by examiner $$\delta F_{net} = T * U + F_{ambient}$$

$$\begin{Bmatrix} \delta F_1 \\ \delta F_2 \\ \delta F_3 \\ \delta M_1 \\ \delta M_2 \\ \delta M_3 \end{Bmatrix}_{6 \times 1} = \begin{bmatrix} \delta F_1/\delta u_1 & \delta F_1/\delta u_2 & \delta F_1/\delta u_3 & \delta F_1/\delta u_4 & \delta F_1/\delta u_5 & \delta F_1/\delta u_6 \\ \delta F_2/\delta u_1 & \delta F_2/\delta u_2 & \delta F_2/\delta u_3 & \delta F_2/\delta u_4 & \delta F_2/\delta u_5 & \delta F_2/\delta u_6 \\ \delta F_3/\delta u_1 & \delta F_3/\delta u_2 & \delta F_3/\delta u_3 & \delta F_3/\delta u_4 & \delta F_3/\delta u_5 & \delta F_3/\delta u_6 \\ \delta M_1/\delta u_1 & \delta M_1/\delta u_2 & \delta M_1/\delta u_3 & \delta M_1/\delta u_4 & \delta M_1/\delta u_5 & \delta M_1/\delta u_6 \\ \delta M_2/\delta u_1 & \delta M_2/\delta u_2 & \delta M_2/\delta u_3 & \delta M_2/\delta u_4 & \delta M_2/\delta u_5 & \delta M_2/\delta u_6 \\ \delta M_3/\delta u_1 & \delta M_3/\delta u_2 & \delta M_3/\delta u_3 & \delta M_3/\delta u_4 & \delta M_3/\delta u_5 & \delta M_3/\delta u_6 \end{bmatrix}_{6 \times 6} \begin{Bmatrix} \delta u_1 \\ \delta u_2 \\ \delta u_3 \\ \delta u_4 \\ \delta u_5 \\ \delta u_6 \end{Bmatrix}_{6 \times 1}$$

SIX HUB LOAD CHANGES THAT ACT ON THE FUSELAGE

MATRIX OF SENSITIVITIES THE DEFINE HOW THE HUB LOADS CHANGE WITH EACH CONTROL INPUT

SIX INDEPENDENT CONTROL CHANGE "KNOBS"

ABOVE EQUATION CAN BE SOLVED *EXACTLY* TO DETERMINE U TO NULLIFY $F_{amb}$ IF T IS "SQUARE" I.E. THE NUMBER OF INDEPENDENT ROWS OF T IS EQUAL TO THE NUMBER OF INDEPENDENT COLUMNS.

IF: $F_{net} = 0$

THEN: $U = T^{-1} * F_{ambient}$

FIG. 7A

VIBRATION CONTROL OF A SWASHPLATELESS COAXIAL ROTOR

BACKGROUND OF THE INVENTION

Exemplary embodiments of the invention generally relate to a rotary wing aircraft, and more particularly, to a higher harmonic vibration control system therefor.

The reduction of vibrations is a primary goal in rotary-wing aircraft design. Such vibrations may contribute to crew fatigue, increased maintenance, and operating costs. A major cause of such vibrations is periodic aerodynamic loads on the rotor blades.

An effective method of reducing rotor-blade induced vibrations is to control the harmonic airload at the source, i.e., on the rotor blades. For an N bladed rotor, harmonic loads at a frequency rate of (N−1) per revolution, N per revolution, and (N+1) per revolution are transmitted to the rotor hub. All three harmonic load frequencies in the rotating rotor frame of reference result in fuselage vibration in the non-rotating frame of reference at the frequency ratio of N/revolution (hereinafter NP). The function of a higher harmonic control (HHC) device is to generate additional airloads on the rotor so as to reduce or cancel the NP vibratory hub load and thus reduce NP vibration in the non-rotating frame of reference.

Various schemes for reducing helicopter vibrations by HHC have been investigated. Some approaches are based on vibration control concepts involving dynamically tuned mechanisms which actuate either the swashplate or tab surfaces on the rotor blade. Other HHC concepts make use of high frequency active control systems which, when coupled with vibration sensors, provide vibration reduction by either manual control or closed loop feedback control.

Reducing rotor-blade induced vibrations in a dual, counter-rotating, coaxial rotor system is further complicated as control inputs to the upper rotor control system and lower rotor control system are typically linked or slaved. As such, HHC systems have heretofore been linked or slaved such that the HHC inputs to the upper rotor system are a fixed multiple of the inputs to the lower rotor system. Such linkage may well be acceptable to reduce vibrations to a certain extent but will not provide the more significant vibration reduction levels demanded by current rotary-wing aircraft operators.

The 1980 American Helicopter Society (AHS) paper entitled "Design of Higher Harmonic Control for the ABC", J. O'Leary and W. Miao, publicly describes the originally proposed HHC system for an aircraft with a coaxial rotor system. The system does control six "signal" actuators to provide HHC inputs to the main servos i.e., three inputs to the signal actuators inputting into main servo of the upper rotor and three inputs to the signal actuators inputting into the main servos of the lower rotor. In this case, however, the three inputs to the upper signal actuators are fixed multiples of the three inputs to the lower signal actuators such that the upper rotor signal inputs are "slaved" to the lower rotor signal inputs. The pilot flight controls for the upper and lower rotors were also slaved together. Thus, following this slaving philosophy for the HHC inputs was a natural approach. It is apparent in this AHS paper that the analyses projected imperfect vibration control. This is because the slaving process only produces a total of three unique controls whereas there are up to six vibratory hub loads that require suppression for excellent vibration reduction.

BRIEF DESCRIPTION OF THE INVENTION

According to one embodiment of the invention, a rotary wing aircraft is provided including a dual counter-rotating, coaxial rotor system having an upper rotor system and a lower rotor system rotatable about a common axis. A plurality of blade assemblies is mounted to a portion of either the upper rotor system or the lower rotor system. A plurality of individually controllable actuators is coupled to each of the plurality of blade assemblies. Each of the plurality of actuators is configured to control movement of the coupled blade assembly about a pitch axis. The rotary-wing aircraft additionally includes a sensor system within an airframe. A higher harmonic control (HHC) controller is arranged in communication with the sensor system and the plurality of actuators to individually control the upper rotor system and the lower rotor system to reduce vibration.

According to another embodiment of the invention, a method of reducing vibration in a rotary wing aircraft having a dual, counter-rotating, coaxial rotor system having an upper rotor system and a lower rotor system rotatable about a common axis of rotation is provided. At least one actuator of a plurality of actuators, each of which is coupled to a blade assembly of the upper rotor system is individually controlled to control the upper rotor system and to reduce vibration within an airframe of the aircraft. Similarly, at least one actuator of a plurality of actuators, each of which is coupled to a blade assembly of the lower rotor system is individual controlled to control the lower rotor system and to reduce vibration within an airframe of the aircraft.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
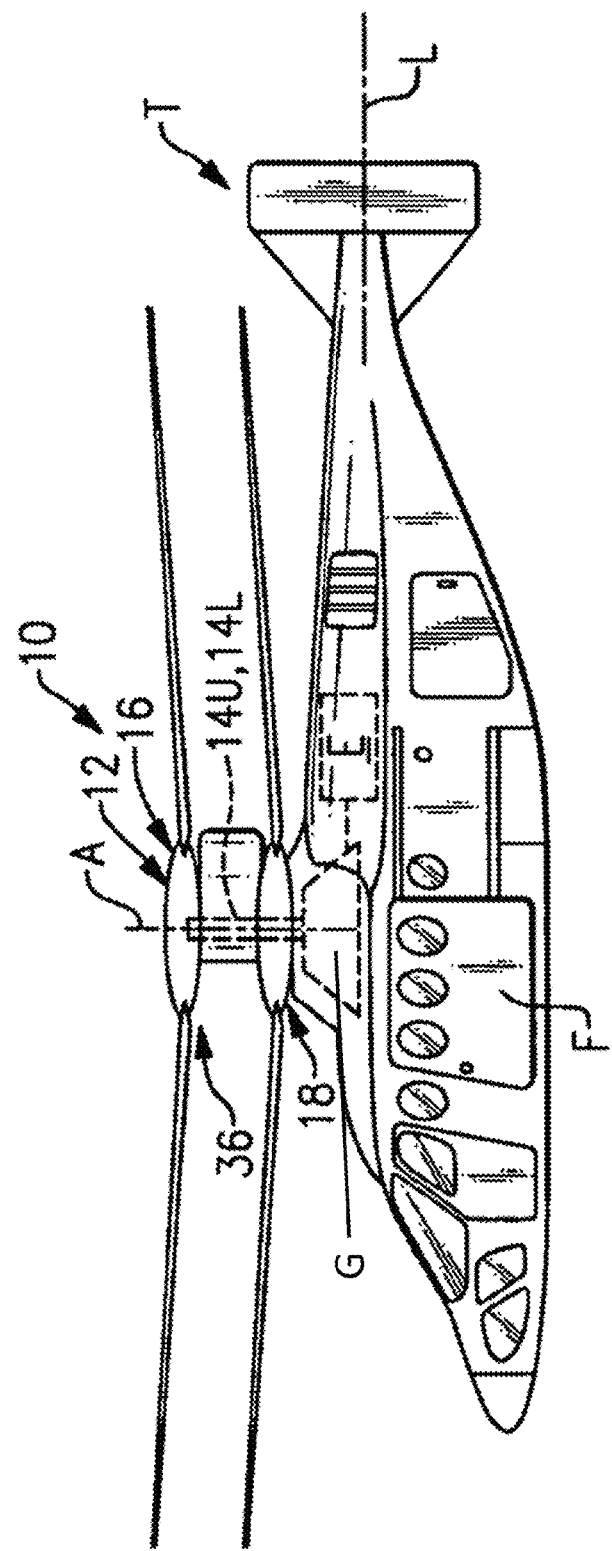
FIG. 1 is a general perspective side view of an exemplary rotary wing aircraft for use with the present invention.

FIG. 1 illustrates an exemplary vertical takeoff and landing (VTOL) rotary wing aircraft 10 having a dual, counter-rotating main rotor system 12, which rotates about a rotating main rotor shaft 14U, and a counter-rotating main rotor shaft 14L (FIG. 2), both about an axis of rotation A. The aircraft 10 includes an airframe F which supports the dual, counter-rotating, coaxial main rotor system 12 as well as an optional translational thrust system T which provides translational thrust during high speed forward flight, generally parallel to an aircraft longitudinal axis L. Although a particular counter-rotating, coaxial rotor system aircraft configuration is illustrated in the disclosed embodiment, other rotor systems and other aircraft types such as tilt-wing and tilt-rotor aircrafts will also benefit from the present invention.

A main gearbox G located above the aircraft cabin drives the rotor system 12. The translational thrust system T may be driven by the same main gearbox G which drives the rotor system 12. The main gearbox G is driven by one or more engines (illustrated schematically at E in FIG. 2). As shown, the main gearbox G may be interposed between the gas turbine engines E, the rotor system 12, and the translational thrust system T.

Figure 2:
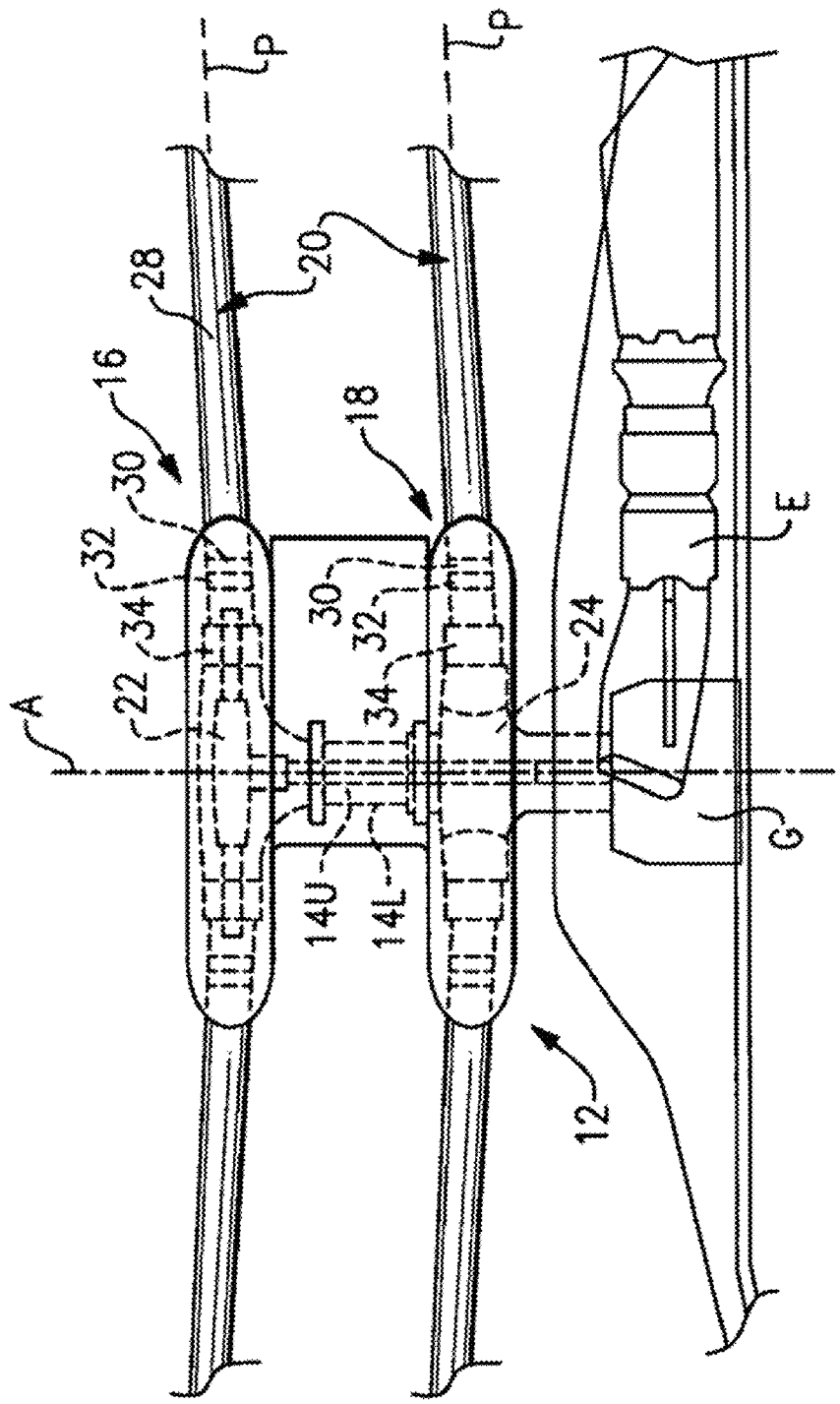
FIG. 2 is an expanded partial phantom view of a dual, counter-rotating, coaxial rotor system of the aircraft of FIG. 1.

Referring now to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter rotates within the lower rotor shaft 14L, which rotates with the lower hub assembly 24.

The plurality of main rotor blade assemblies 20 project substantially radially outward from the hub assemblies 22, 24. Any number of main rotor blade assemblies 20 may be used with the rotor system 12. Each rotor blade assembly 20 of the rotor system 12 generally includes a rotor blade 28 (illustrated somewhat schematically), a rotor blade spindle 30, and a rotor blade bearing 32, which supports the rotor blade spindle 30 within a bearing housing 34 to permit the rotor blade 28 to pitch about a pitching axis P. It should be understood that various blade attachments may be utilized with the present invention.

Figure 3:
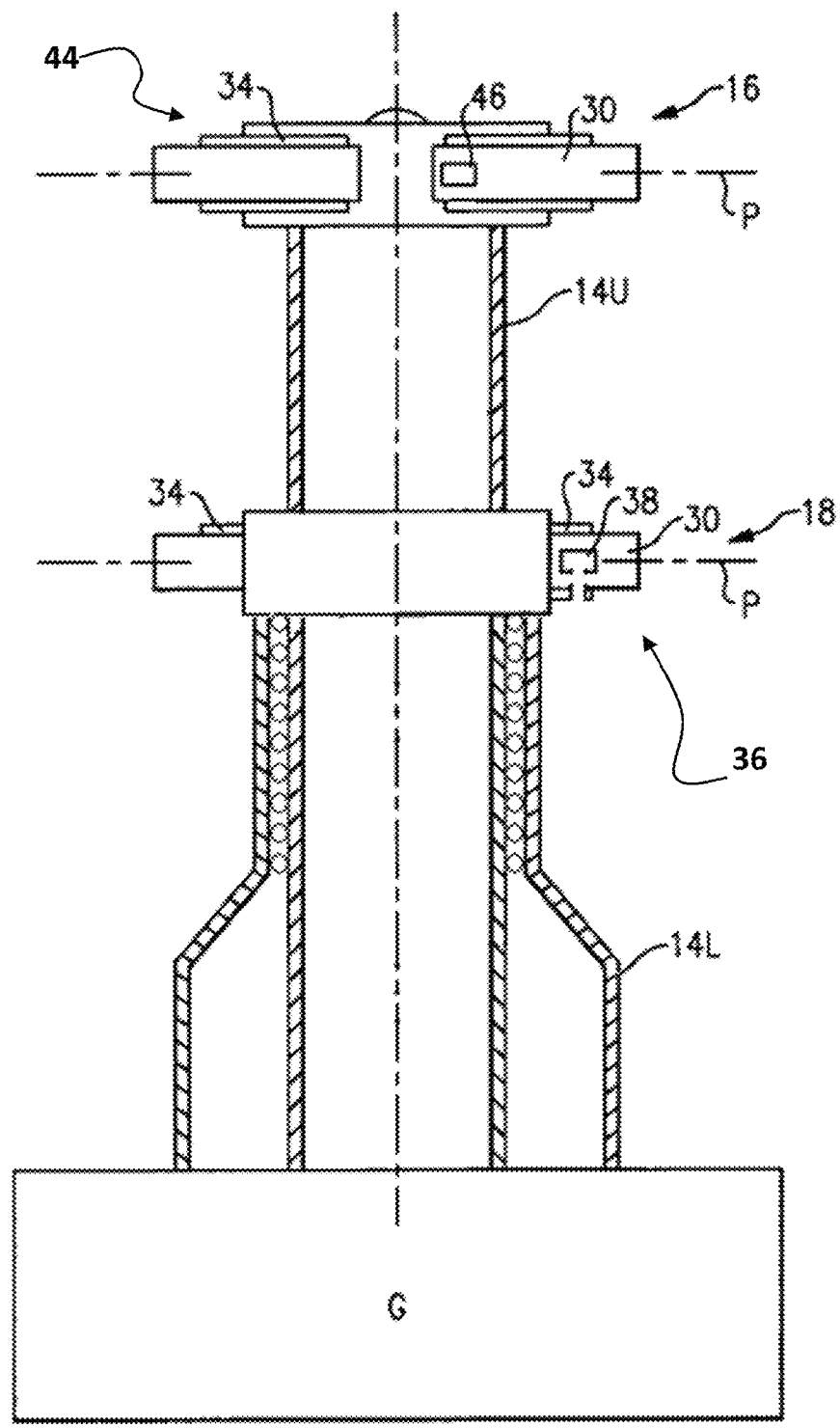
FIG. 3 is a schematic longitudinal sectional view of a swashplateless control system of the dual, counter-rotating, coaxial rotor system of FIG. 2.
Figure 4:
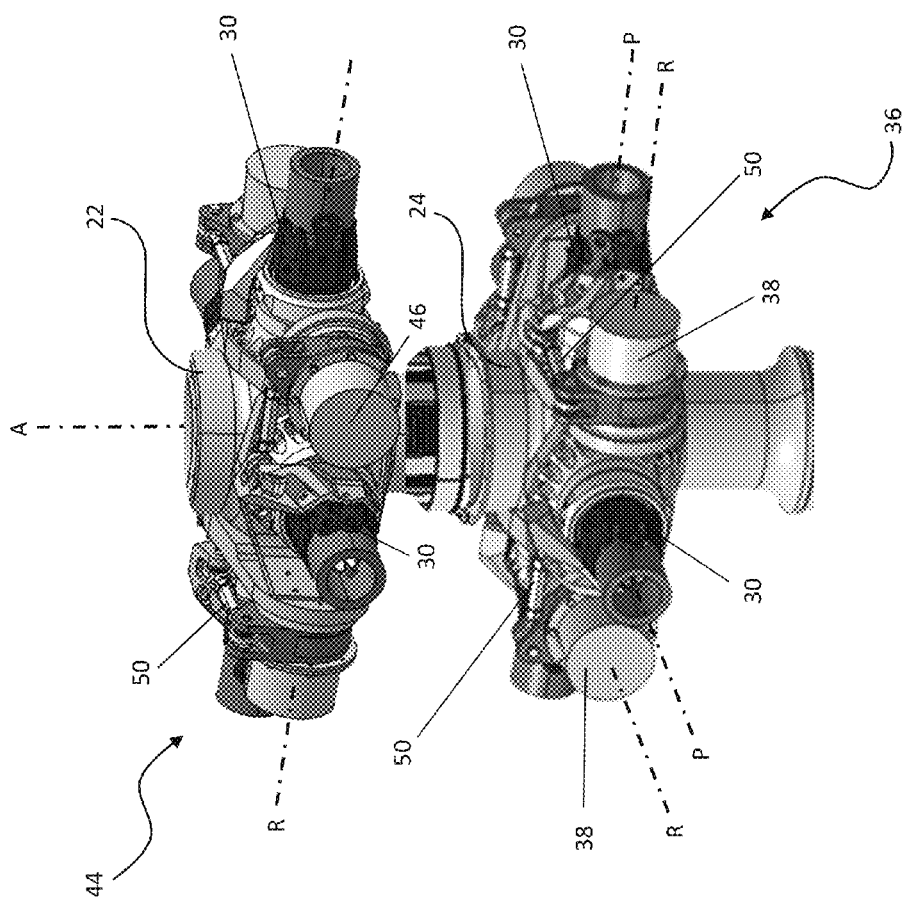
FIG. 4 is a perspective view of an exemplary lower rotor control system according to an embodiment of the invention.

Referring now to FIGS. 3 and 4, a lower rotor independent blade control (IBC) system 36 includes an electrical actuator 38 directly or indirectly coupled to the rotor blade spindle 30 of each lower rotor blade 28. Similarly, an upper rotor IBC system 44 includes an electrical actuator 46 coupled to the rotor blade spindle 30 of each upper rotor blade 28. The actuators 38, 46 are configured to impart a desired pitch control to the rotor blades 28. In the illustrated embodiment, each actuator 38, 46 is mounted to a respective rotor hub 22, 24 adjacent one of the plurality of rotor blade spindles 30 such that the actuators 38, 46 rotate about an axis R parallel to the axis P of an adjacent rotor blade 28. Rotation of each actuator 38, 46 is transferred to a corresponding rotor blade 28 through a linkage 50, such as a connector or gear chain for example. Although a particular IBC system configuration is illustrated in the disclosed embodiment, other IBC systems configurations, such as having actuators 38, 46 mounted concentrically with the rotor blade spindles 30 are within the scope of the invention.

Each actuator 38, 46 of each rotor system 36, 44 may be independently controlled. However, the plurality of actuators 38, 46 within each rotor control system 36, 44 are commonly controlled together. In one embodiment, the actuators 38, 46 are used to similarly rotate the rotor blades 28 of each rotor system 16, 18, thereby varying the pitch at frequencies of (N−1)P, NP, and (N+1)P with respect to axes P for vibration control. Additionally for primary control, the plurality of actuators 38, 46 within each rotor control system 36, 44 may be used to vary the pitch of the rotor blades 28 collectively and cyclically. The rotor control systems 36, 44 are configured to communicate with a flight control system (not shown) which receives pilot inputs from inceptors such as a collective stick, a cyclic stick, foot pedals, and the like, and upon which the higher harmonic control (HHC) commands are superimposed.

Figure 5:
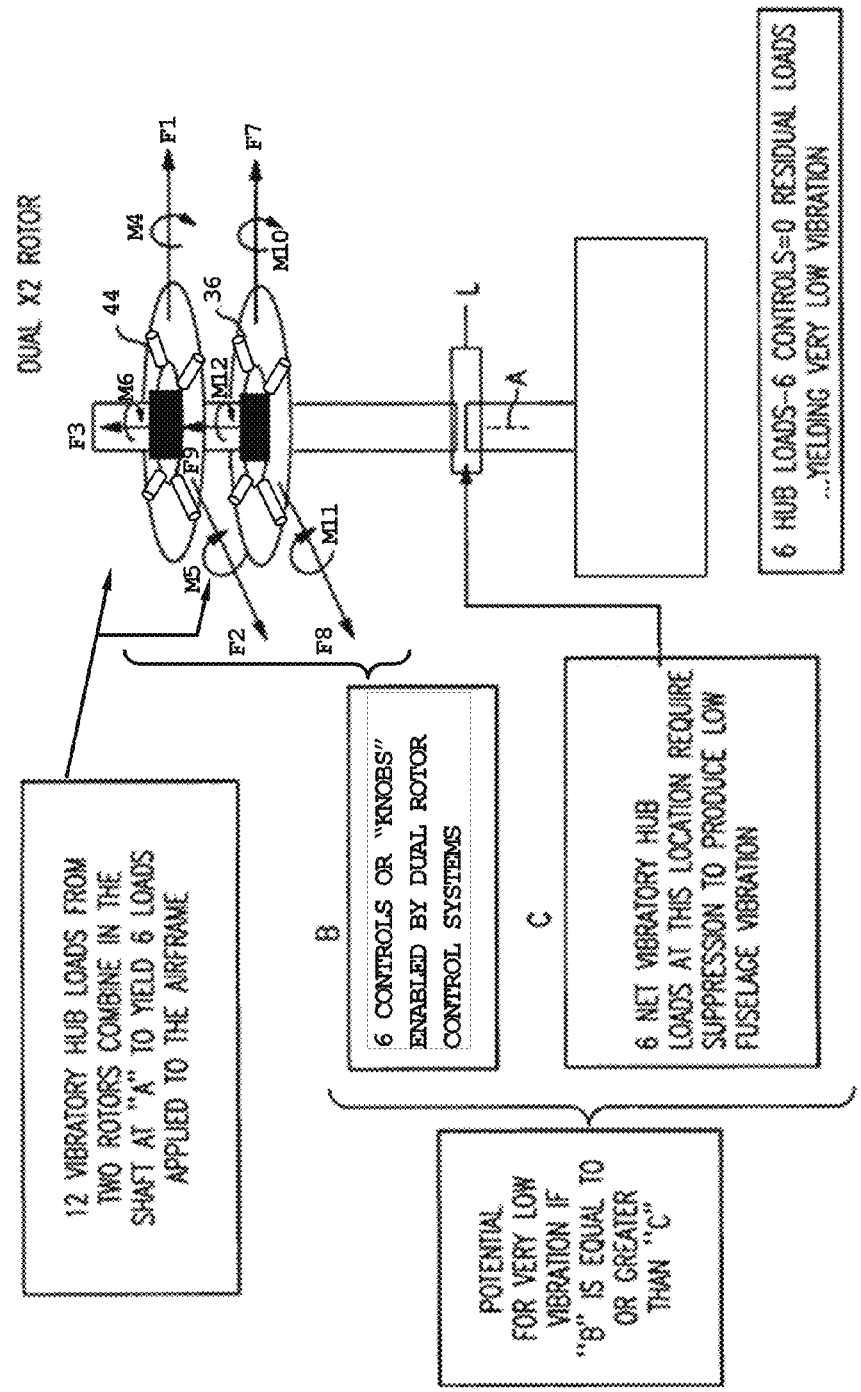
FIG. 5 is a block diagram of the forces, moments, and control loads available for Higher Harmonic Control (HHC) of a dual, counter-rotating, coaxial rotor system.

Referring to FIG. 5, the main rotor system 12 is mounted to the airframe F at a location L and vibrations thereto are transferred at location L. Each of the upper and lower rotor system 16, 18 generates six unique vibratory loads. The counter-rotating, coaxial rotor system 12 thereby provides twelve vibratory hub loads. The twelve vibratory hub loads combine in the rotor system 12 to yield six loads applied to the airframe F at the location L. The two rotor systems 16, 18 do not produce the same set of three six-force patterns because of the difference in position of the two rotor systems 16, 18 i.e., they have different "leverage" with regard to location L. The six net vibratory hub loads at location L call for individual suppression to reduce airframe vibration.

The dual, counter-rotating, coaxial rotor system 12 provides individual control of the upper rotor system 16 and the lower rotor system 18. The lower rotor control system 36 and the upper rotor control system 44 provide a total of six controls or "knobs" to reduce or theoretically eliminate air-frame vibration. In one embodiment, application of HHC to the two rotor systems 16, 18 of a dual, counter-rotating, coaxial rotor system 12, may yield essentially complete vibration reduction because the six controls can sufficiently suppress the six loads. In embodiments where the six controls cannot suppress the six vibratory hub loads at location L, force generators of an active vibration control (AVC) system positioned throughout the airframe F may be used in combination with the HHC system to minimize the vibration in the airframe F.

Figure 6:
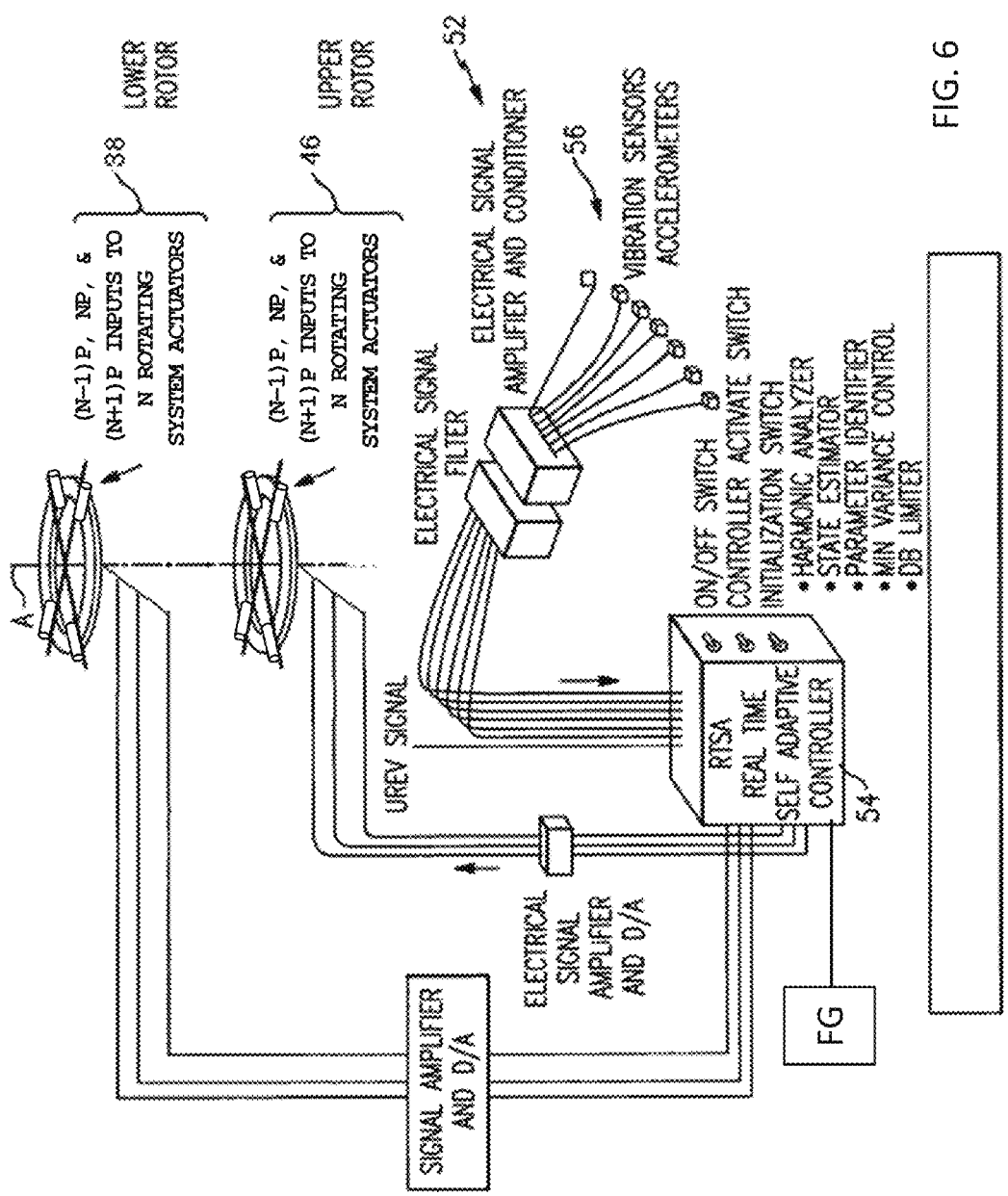
FIG. 6 is a block diagram of a HHC control system for a dual, counter-rotating, coaxial rotor system.
Figure 7B:
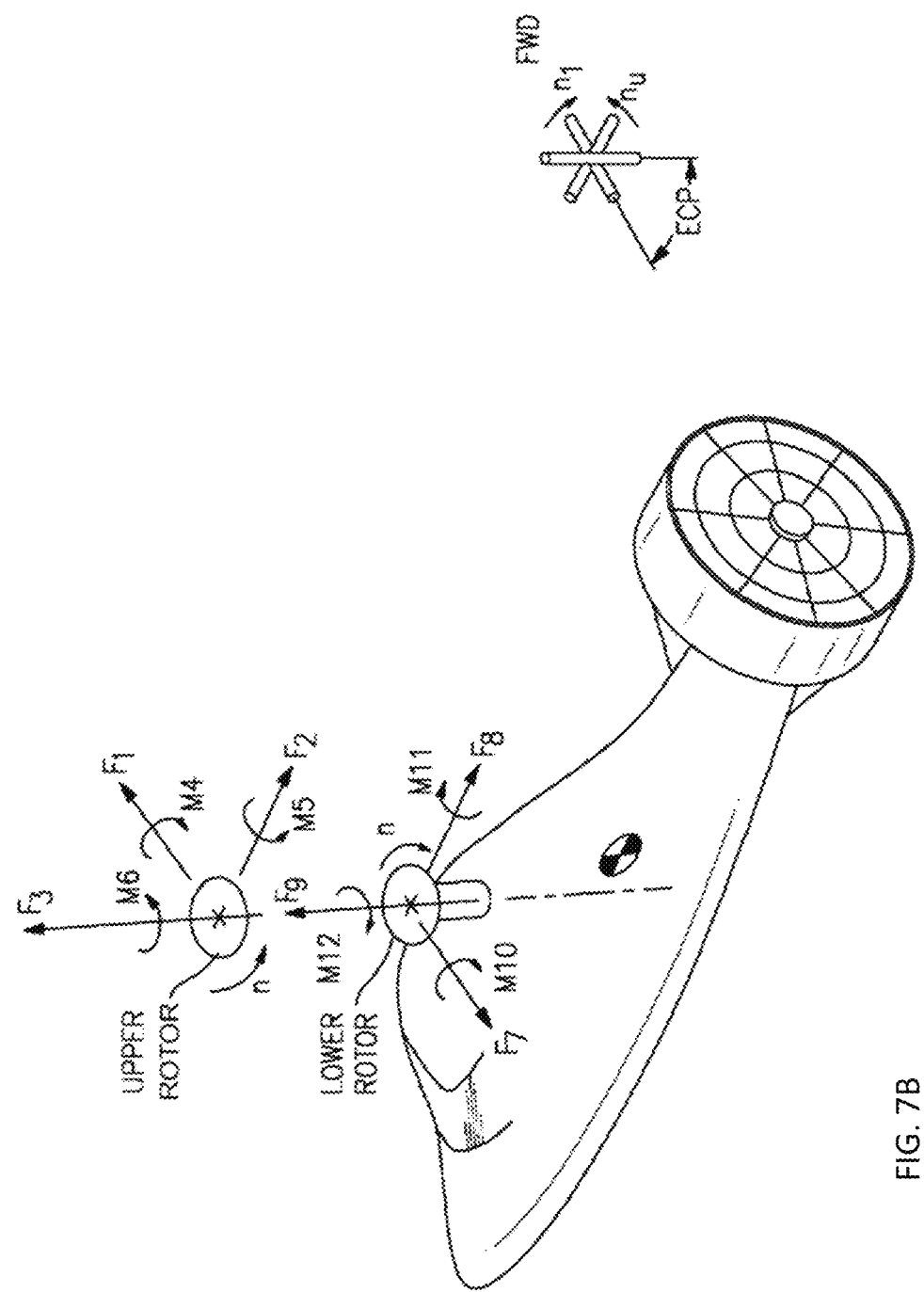
FIG. 7A is a matrix explanation for the HHC control system of a dual, counter-rotating, coaxial rotor system having forces and moments as represented in FIG. 7B.

Referring now to FIG. 6, an HHC system 52 generally includes a controller 54 and a sensor system 56 in communication with the controller 54. The controller 54 is operably coupled to the actuators 38, 46 of the lower and upper rotor control systems 36, 44. In addition, the controller 54 is in communication with the sensor system 56 to sense vibration within the airframe F. It should be understood that various sensors at various locations may be utilized with the present invention. In one embodiment, the controller 54 is an adaptive controller configured to control the plurality of actuators 38 of the lower rotor control system 36 and the plurality of actuators 46 of the upper rotor control system 44 separately. The controller 54 may provide closed loop control of the plurality of actuators 38, 46 to reduce vibration thereof in accordance with an HHC algorithm (FIGS. 7A and 7B). It should be understood that the upper rotor control system 44 and the lower rotor control system 36 are preferably overlaid or integrated with the pilot inputs with the plurality of actuators 38, 46. It should be understood that various actuator systems may be utilized with the present invention so long as active control is provided individually in each axis of both the upper and lower rotor system 16, 18. In embodiments where the aircraft 10 includes an AVC system in the airframe F, the controller 54 uses the information provided by the sensors 56 to calculate a command for each of the plurality of force generators, illustrated schematically at FG, in addition to calculating commands for the plurality of rotating system actuators 38, 46.

The matrix arithmetic shown in FIG. 7A is a math model that represents how the six HHC controls, U, three from each rotor control system 36, 44, influence the six net hub loads F. The square matrix T quantitatively relates the influence of U on F. Well known mathematics indicates that if the matrix T is square, and each column of T is independent, then matrix T can be "inverted" and a control solution, U can be found that will make all elements of F equal to zero. This is a math illustration of why six controls of known (U) are may be used to reduce or completely nullify six hub loads. If only three unique values of U existed, it would be difficult to completely nullify F. It should be understood that the matrix arithmetic shown in FIG. 7A does not apply to embodiments where the HHC controls work in concert with the AVC actuators. In this scenario, the force matrices $F_{net}$ and $F_{ambient}$ are replaced with vibration matrices, there are more than six control knobs, and the matrix T is not square.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotary wing aircraft comprising:
    a dual, counter-rotating, coaxial rotor system having an upper rotor system and a lower rotor system rotatable about a common axis relative to an airframe, the upper rotor system including a first rotatable shaft and the lower rotor system including a second rotatable shaft;
    a plurality of upper blade assemblies mounted to the upper rotor system;
    a plurality of lower blade assemblies mounted to the lower rotor system;
    a plurality of upper actuators, each of the plurality of upper actuators being positioned exterior to the plurality of upper blade assemblies and coupled to one of the plurality of upper blade assemblies, wherein a rotational axis of each of the plurality of upper actuators is arranged within a plane including a pitch axis of the plurality of upper blade assemblies;
    a plurality of lower actuators, each of the plurality of lower actuators being coupled to one of the plurality of lower blade assemblies being positioned exterior to the plurality of lower blade assemblies and coupled to one of the plurality of lower blade assemblies, wherein a rotational axis of the plurality lower actuators is arranged within a plane including a pitch axis of the plurality of lower blade assemblies;
    a Higher Harmonic Control (HHC) system including:
        a sensor system within the airframe; and
        an HHC controller in communication with the sensor system, the plurality of upper actuators, and the plurality of lower actuators, wherein the HHC controller is configured to actively control each of the plurality of upper actuators individually to control movement of each of the plurality of upper blade assemblies about the pitch axis and the HHC controller is configured to actively control each of the plurality of lower actuators individually to control movement of each of the plurality of lower blade assemblies about the pitch axis to reduce vibration within the airframe in accordance with an HHC algorithm in response to the sensor system, wherein six unique vibration loads of each of the upper rotor system and the lower rotor system combine in the coaxial rotor system to yield six next vibratory hub loads applied to the airframe at a location where the coaxial rotor system is mounted to the airframe, wherein the plurality of upper actuators and the plurality of lower actuators in combination suppress the six net vibratory hub loads to produce low fuselage vibration; and
        an active vibration control system including a plurality of force generators positioned about the airframe, the HHC controller being configured to calculate a command for each of the plurality of force generators based on information provided by the sensor system.

2. The rotary-wing aircraft according to claim 1, wherein an axis of rotation of each of at least one of the plurality of upper actuators and the plurality of lower actuators is arranged generally parallel to the pitch axis of the blade assembly coupled thereto.

3. The rotary-wing aircraft according to claim 2, wherein a linkage extends between each of at least one of the plurality of upper actuators and the plurality of lower actuators and the blade assembly coupled thereto.

4. The rotary-wing aircraft according to claim 3, wherein the linkage includes at least one connector.

5. The rotary-wing aircraft according to claim 3, wherein the linkage includes a gear chain.

6. The rotary-wing aircraft according to claim 1, wherein the HHC controller provides closed loop control of the plurality of actuators.

7. The rotary-wing aircraft according to claim 1, wherein the HHC controller individually controls at least one actuator coupled to the upper rotor system and at least one actuator coupled to the lower rotor system to reduce the six net vibratory loads.

8. The rotary-wing aircraft according to claim 7, wherein the HHC controller utilizes matrix arithmetic with a square matrix that quantitatively relates the influence of at least one of the plurality of uppers actuators and at least one of the plurality of lower actuators on the six unique vibratory loads.

9. The rotary-wing aircraft according to claim 8, wherein the HHC controller utilizes an inverse of the square matrix to determine a control solution that controls at least one of the plurality of uppers actuators and at least one of the plurality of lower actuators.

10. The rotary-wing aircraft according to claim 7, wherein the HHC controller utilizes matrix arithmetic to determine a minimum vibration control solution that controls at least one of the plurality of uppers actuators and at least one of the plurality of lower actuators, and at least one individually controllable force generator coupled to airframe.

11. A method of reducing vibration in a rotary wing aircraft airframe having a dual, counter-rotating, coaxial rotor system having an upper rotor system including an upper rotor shaft and a lower rotor system including a lower rotor shaft, the upper and lower rotor shafts being rotatable about a common axis of rotation comprising:
    providing a plurality of upper actuators, each of the plurality of upper actuators being coupled to a blade assembly of a plurality of blade assemblies of the upper rotor system such that each upper actuator is operable to control movement of the blade assembly coupled thereto about a pitch axis, the plurality of upper actuators being positioned exterior to the upper rotor shaft and to the plurality of blade assemblies, wherein a rotational axis of the plurality of upper actuators and the pitch axis of the plurality of blade assemblies of the upper rotor system are arranged within a plane;
    providing a plurality of lower actuators, each of the plurality of lower actuators being coupled to a blade assembly of a plurality of blade assemblies of the lower rotor system such that each lower actuator is operable to control movement of the blade assembly coupled thereto about a pitch axis, the plurality of lower actuators being positioned exterior to the lower rotor shaft and to the plurality of blade assemblies, wherein a rotational axis of the plurality of lower actuators and the pitch axis of the plurality of blade assemblies of the lower rotor system are arranged within a plane;

actively controlling the plurality of upper actuators and the plurality of lower actuators separately;

individually and actively controlling at least one actuator of the plurality of upper system to control the upper rotor system in an X-Y-Z axis and to reduce vibration within an airframe of the aircraft in accordance with a Higher Harmonic Control (HHC) algorithm in response to vibration in the airframe sensed by the sensor system; and individually and actively controlling at least one actuator of a plurality of lower actuators to control the lower rotor system in an X-Y-Z axis and to reduce vibration within an airframe of the aircraft in accordance with the HHC algorithm in response to vibration in the airframe sensed by the sensor system, wherein six unique vibration loads of the upper rotor system and six unique vibration loads of the lower rotor system combine in the coaxial rotor system to yield six net vibratory hub loads applied to the airframe at a location where the coaxial rotor system is mounted to the airframe, the plurality of upper actuators and the plurality of lower actuators are operated independently, such that the plurality of upper actuators and the plurality of lower actuators in combination suppress the six net vibration hub loads are suppressed to produce low fuselage vibration; and generating commands for a plurality of force generators positioned about the airframe, the plurality of force generators being configured to cooperate with the plurality of actuators to reduce vibration within the airframe.

12. The method according to claim 11, wherein the upper rotor system and the lower rotor system each generate six unique vibratory loads such that the counter-rotating, coaxial rotor system generates twelve vibratory hub loads, the twelve vibratory hub loads combine in the counter-rotating, coaxial rotor system to yield six net vibratory loads applied to the airframe; and reducing the six net vibratory loads by individually controlling at least one of the plurality of upper actuators and at least one of the plurality of lower actuators.

* * * * *